(12) United States Patent
Campbell et al.

(10) Patent No.: US 8,250,843 B2
(45) Date of Patent: Aug. 28, 2012

(54) COMBINATION BIOMASS HARVESTER AND BALER

(75) Inventors: Robert G. Campbell, Ernul, NC (US); Howard Duzan, Columbus, MS (US); James R. Leist, Columbus, MS (US)

(73) Assignee: Weyerhaeuser NR Company, Federal Way, WA (US)

( * ) Notice: Subject to any disclaimer, the term of this patent is extended or adjusted under 35 U.S.C. 154(b) by 281 days.

(21) Appl. No.: 12/750,958

(22) Filed: Mar. 31, 2010

(65) Prior Publication Data

US 2011/0239607 A1 Oct. 6, 2011

(51) Int. Cl.
*A01D 39/00* (2006.01)
*A01D 43/02* (2006.01)
*A01D 75/00* (2006.01)

(52) U.S. Cl. .......................... 56/341; 100/100
(58) Field of Classification Search .............. 56/341, 56/344; 100/100, 214, 2, 3, 7, 8, 35, 41, 100/177, 178, 179, 192, 215, 240, 226
See application file for complete search history.

(56) References Cited

U.S. PATENT DOCUMENTS

| | | | | |
|---|---|---|---|---|
| 3,412,532 A * | 11/1968 | Nickla | | 56/13.3 |
| 3,926,319 A * | 12/1975 | Neely, Jr. | | 414/789.7 |
| 3,933,314 A | 1/1976 | Luscombe | | |
| 4,478,226 A | 10/1984 | Tophinke | | |
| 4,750,323 A | 6/1988 | Sheehan et al. | | |
| 4,819,418 A | 4/1989 | Ratzlaff et al. | | |
| 4,829,756 A | 5/1989 | Schrag et al. | | |
| 4,870,812 A | 10/1989 | Jennings et al. | | |
| 4,912,914 A * | 4/1990 | Wingard | | 56/16.4 B |
| 5,557,859 A * | 9/1996 | Baron | | 34/378 |
| 5,621,391 A | 4/1997 | Elseth | | |
| 5,682,683 A | 11/1997 | Haimer | | |
| 5,863,005 A | 1/1999 | Bramstedt et al. | | |
| 6,032,446 A * | 3/2000 | Gola et al. | | 56/341 |
| 6,263,650 B1 * | 7/2001 | Deutsch et al. | | 56/16.4 B |
| 6,421,992 B1 * | 7/2002 | Goering et al. | | 56/28 |
| 6,421,996 B1 * | 7/2002 | Deutsch et al. | | 56/341 |
| 6,651,417 B1 * | 11/2003 | Lackey | | 56/341 |
| 6,766,634 B2 * | 7/2004 | Covington et al. | | 56/480 |
| 6,845,709 B1 * | 1/2005 | Lackey | | 100/1 |
| 6,901,732 B2 * | 6/2005 | Bares et al. | | 56/341 |
| 6,938,401 B2 * | 9/2005 | Bares et al. | | 56/13.1 |
| 6,941,740 B2 * | 9/2005 | Fox et al. | | 56/341 |
| 7,003,933 B2 * | 2/2006 | Fukumori et al. | | 53/504 |
| 7,370,573 B1 * | 5/2008 | Lackey | | 100/35 |
| 7,591,628 B2 * | 9/2009 | Noonan et al. | | 414/607 |
| 7,624,679 B2 * | 12/2009 | Richman et al. | | 100/188 R |
| 7,743,595 B2 * | 6/2010 | Savoie et al. | | 56/341 |
| 2006/0201022 A1 | 9/2006 | Logan | | |
| 2009/0019826 A1 * | 1/2009 | Rigney | | 56/13.5 |
| 2009/0242077 A1 | 10/2009 | Prohaska | | |
| 2010/0326037 A1 * | 12/2010 | Dillon | | 56/341 |
| 2010/0326292 A1 * | 12/2010 | Dillon | | 100/2 |
| 2010/0330337 A1 * | 12/2010 | Dillon | | 428/156 |
| 2011/0239607 A1 * | 10/2011 | Campbell et al. | | 56/14.5 |

OTHER PUBLICATIONS

Hesston Swather, FLD Biomass WB55 Bio-Baler,: http://www.masseyferguson.com/agco/MF/NA/CombHarv/9000S.htm, 2009.

(Continued)

*Primary Examiner* — Arpad Fabian-Kovacs
(74) *Attorney, Agent, or Firm* — Woodcock Washburn LLP

(57) ABSTRACT

A combination biomass harvester and baler, in some embodiments, can include a self-propelled vehicle base, an engine compartment, a fuel and radiator compartment, a movement mechanism operably connected to the self-propelled vehicle base, a cutting head assembly, a transfer assembly, and a baler assembly. The baler assembly may be configured to consolidate the biomass into one or more bales. A bale carrying platform is provided to store the bales while the combination biomass harvester and baler continues to move.

20 Claims, 5 Drawing Sheets

OTHER PUBLICATIONS

Massey Ferguson 900 Series Swather Supertrak Biobaler: http://www.supertrak.com/products.php?page=BIOBALER, 2009.

Dooley, James H., et al.; Biomass Baling into Large Squares Bales for Efficient Transport, Storage, and Handling, Prepared for Presentation at: Counsel on Forest Engineering 2008: 31st Annual Meeting, Jun. 22-25, 2008 Charleston, SC.

Roise, Joseph, et al.; Harvesting Small Diameter Woody Biomass, Forestry and Environmental Resources, North Carolina State University, 2009.

Ahwi, The Biomass Harvesting System H600, Getting the very best cut with the Biomass Harvester, Sep. 28, 2009, www.ahwi.com.

\* cited by examiner

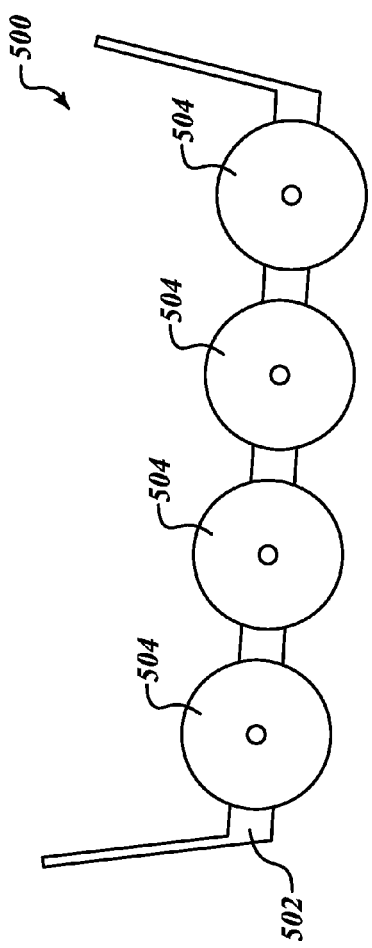
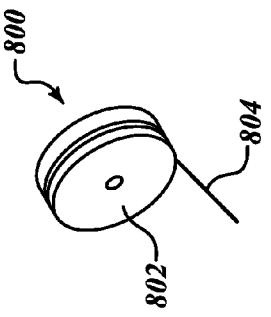
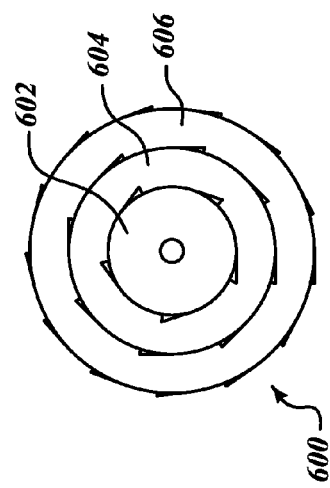
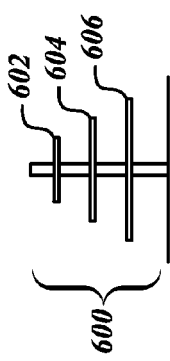

COMBINATION BIOMASS HARVESTER AND BALER

TECHNICAL FIELD

The present disclosures relates to a combination biomass harvester and baler for performing the functions of harvesting and baling biomass using a single piece of equipment.

BACKGROUND

Due to diminishing quantities of coal, petroleum, and natural gas products, attention is being directed to other energy sources, including oil shale, solar energy, and nuclear energy. One source receiving considerable attention is biomass materials such as wood and its byproducts. Biomass has the potential for use in countless different applications including generating heat, production of liquid fuel, production of biogas, generating bioelectricity, and production of feedstock for chemicals and other materials.

As woody and herbaceous biomass becomes more and more viable for renewable energy, equipment companies have started engineering machines capable of harvesting biomass quickly and efficiently. In conventional biomass harvesting operations, biomass is cut with a harvester such as a disc mower or a self-propelled hay swather. A truck pulling a baler assembly follows the harvester, collects the biomass that has been cut and forms it into round or rectangular bales. In some situations, the baler may be self-propelled, thereby eliminating the need for a truck. After baling, the bales of biomass are tied and transported for use in specific applications such as those mentioned above.

As the demand for clean energy solutions and the interest in utilizing biomass continues to grow, the need for specialized and efficient equipment will also become more apparent. One opportunity for improving current systems may include combining the functions of harvesting and baling in a single multi-functional piece of equipment. By combining these steps into one machine, the time and cost associated with biomass harvesting may be substantially reduced when compared to current methods.

SUMMARY

The following summary is provided for the benefit of the reader only and is not intended to limit in any way the invention as set forth by the claims. The present disclosure is directed generally towards a combination biomass harvester and baler. The combination biomass harvester and baler is equipped to perform the functions of harvesting and baling biomass using a single piece of equipment.

In some embodiments, the combination biomass harvester/baler includes a self-propelled vehicle base, an engine compartment, a fuel and radiator compartment, a movement mechanism operably connected to the self-propelled vehicle base, and a cutting head assembly, a transfer assembly, and a baler assembly. The cutting head assembly may be, for example, a disc cutter, a string trimmer, or a plurality of stacked sawheads. The transfer assembly is configured to transfer cut biomass to the baler assembly that is configured to consolidate the biomass into one or more bales. A bale carrying platform is provided to store the bales while the combination biomass harvester and baler continues to move.

BRIEF DESCRIPTION OF THE DRAWINGS

The present disclosure is better understood by reading the following description of non-limitative embodiments with reference to the attached drawings wherein like parts of each of the figures are identified by the same reference characters, and are briefly described as follows:

FIGS. 5-8 are schematic top views of cutting head assemblies in accordance with embodiments of the disclosure.

DETAILED DESCRIPTION

The present disclosure describes a combination biomass harvester and baler. Certain specific details are set forth in the following description and FIGS. 1-8 to provide a thorough understanding of various embodiments of the disclosure. Well-known structures, systems, and methods often associated with such systems have not been shown or described in details to avoid unnecessarily obscuring the description of various embodiments of the disclosure. In addition, those of ordinary skill in the relevant art will understand that additional embodiments of the disclosure may be practiced without several of the details described below.

In this disclosure, the term "biomass" will be used to refer to woody and herbaceous material from forest growth. Biomass includes, for example, switchgrass, understory, forage, interplanted crops, shrubs, grasses, trees, clippings, branches, wood chips, and other herbaceous material, energy crops. A person of ordinary skill in the art will appreciate that the disclosure is intended to encompass combination biomass harvester/balers suitable for use with types of biomass not explicitly mentioned in the listing above.

Figure 1:
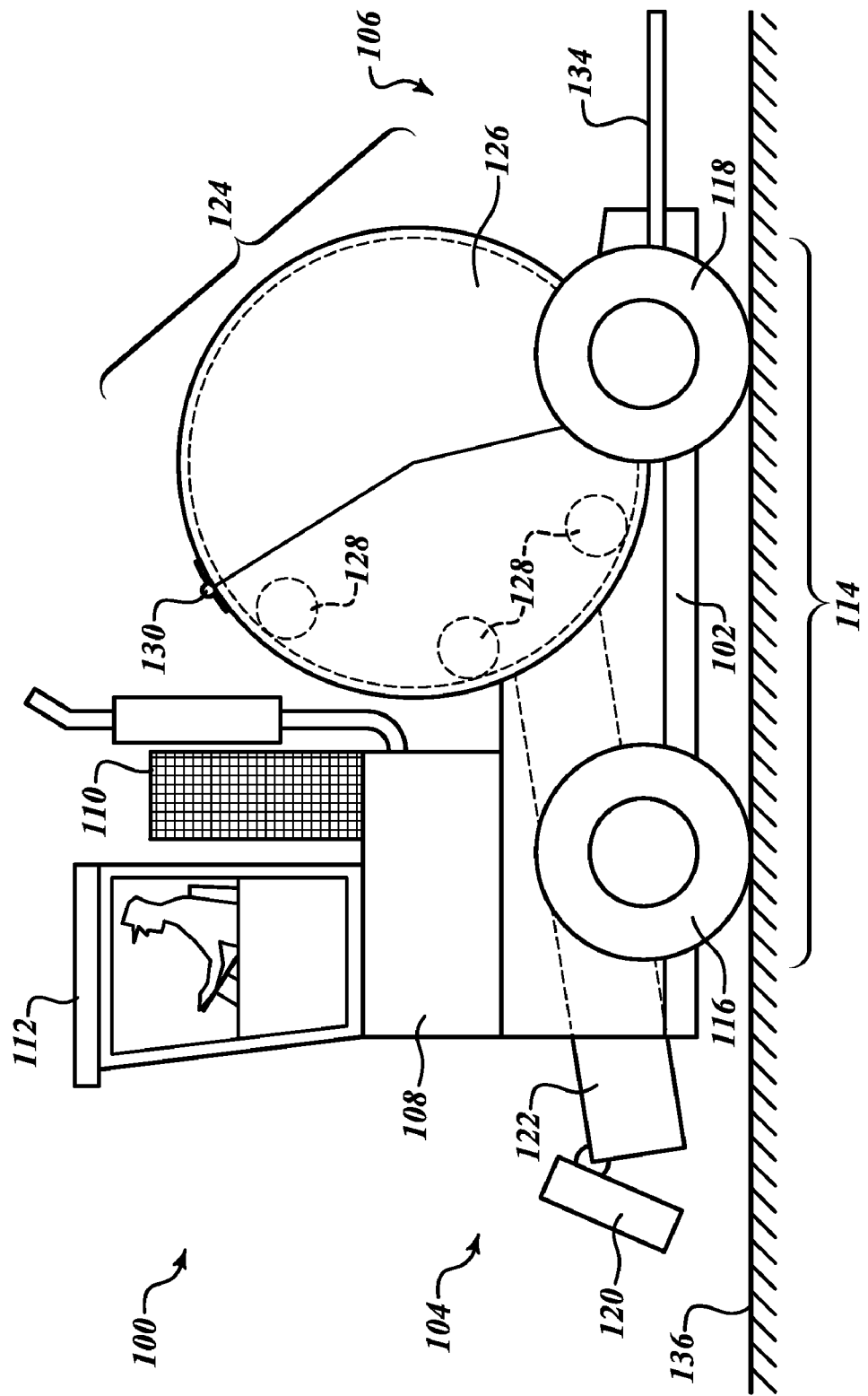
FIG. 1 is a schematic side view of a combination biomass harvester and baler in accordance with embodiments of the disclosure.
Figure 2:
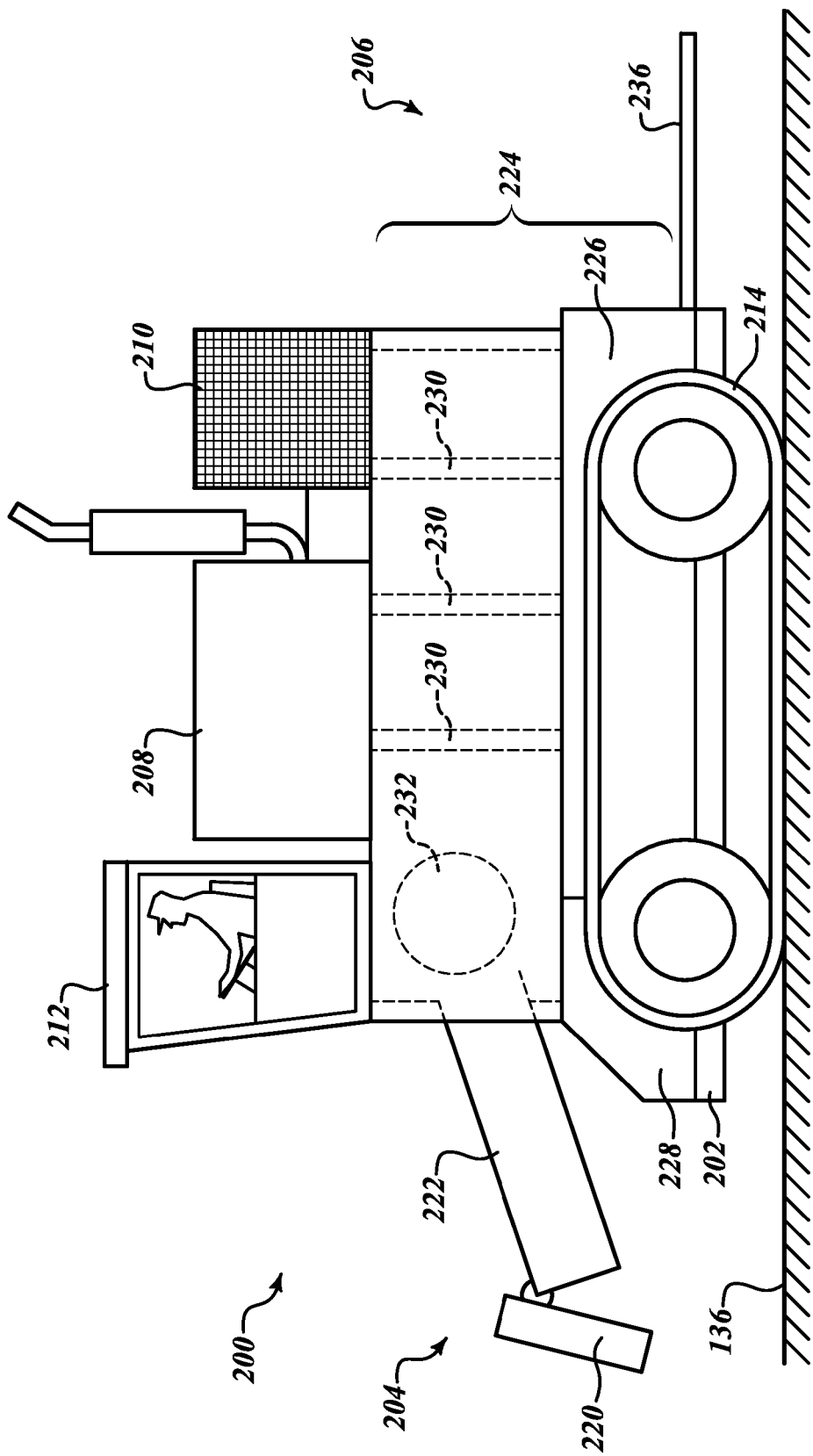
FIG. 2 is a schematic side view of another combination biomass harvester and baler in accordance with embodiments of the disclosure.
Figure 3:
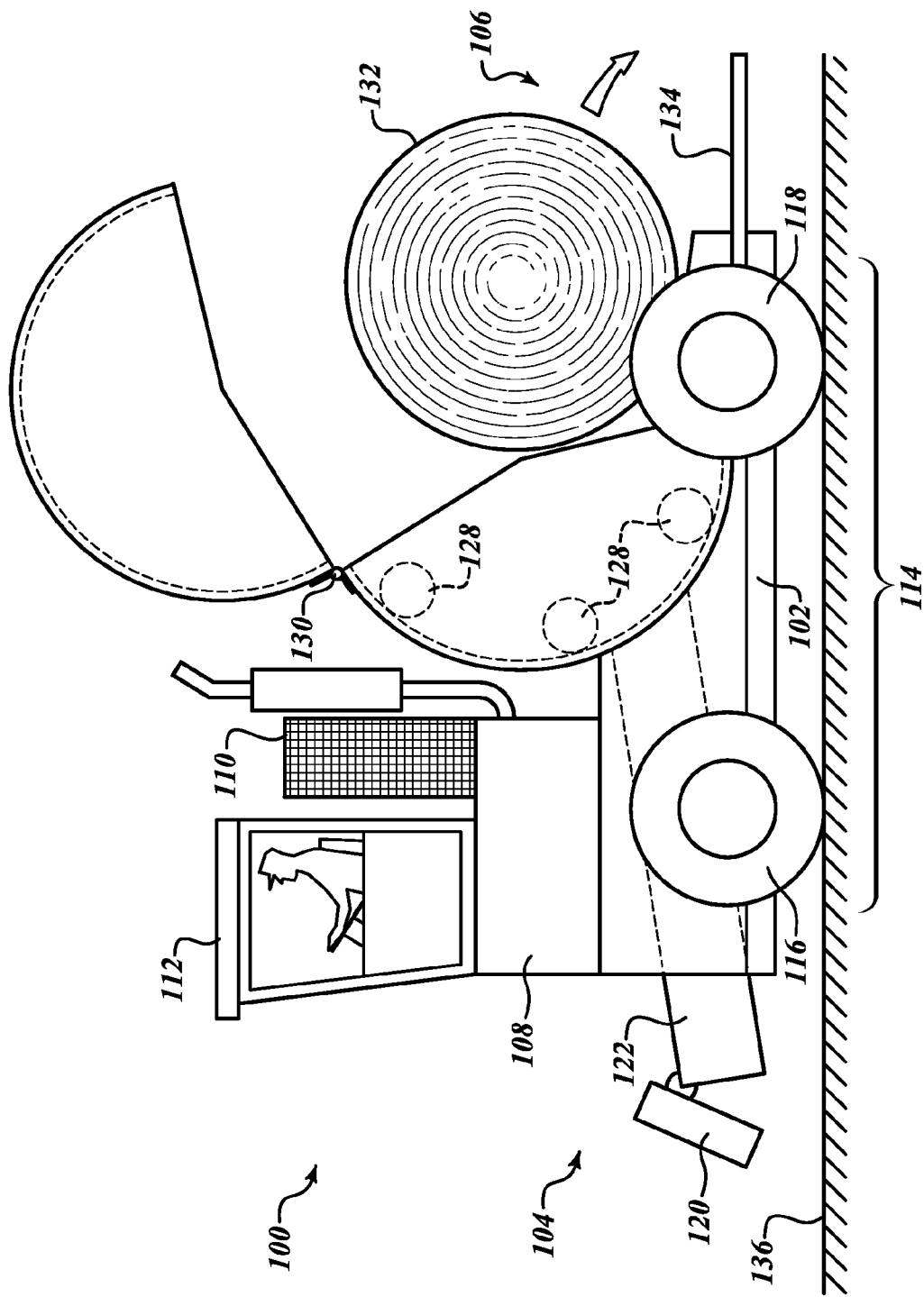
FIG. 3 is a schematic side view of the combination biomass harvester and baler from FIG. 1.
Figure 4:
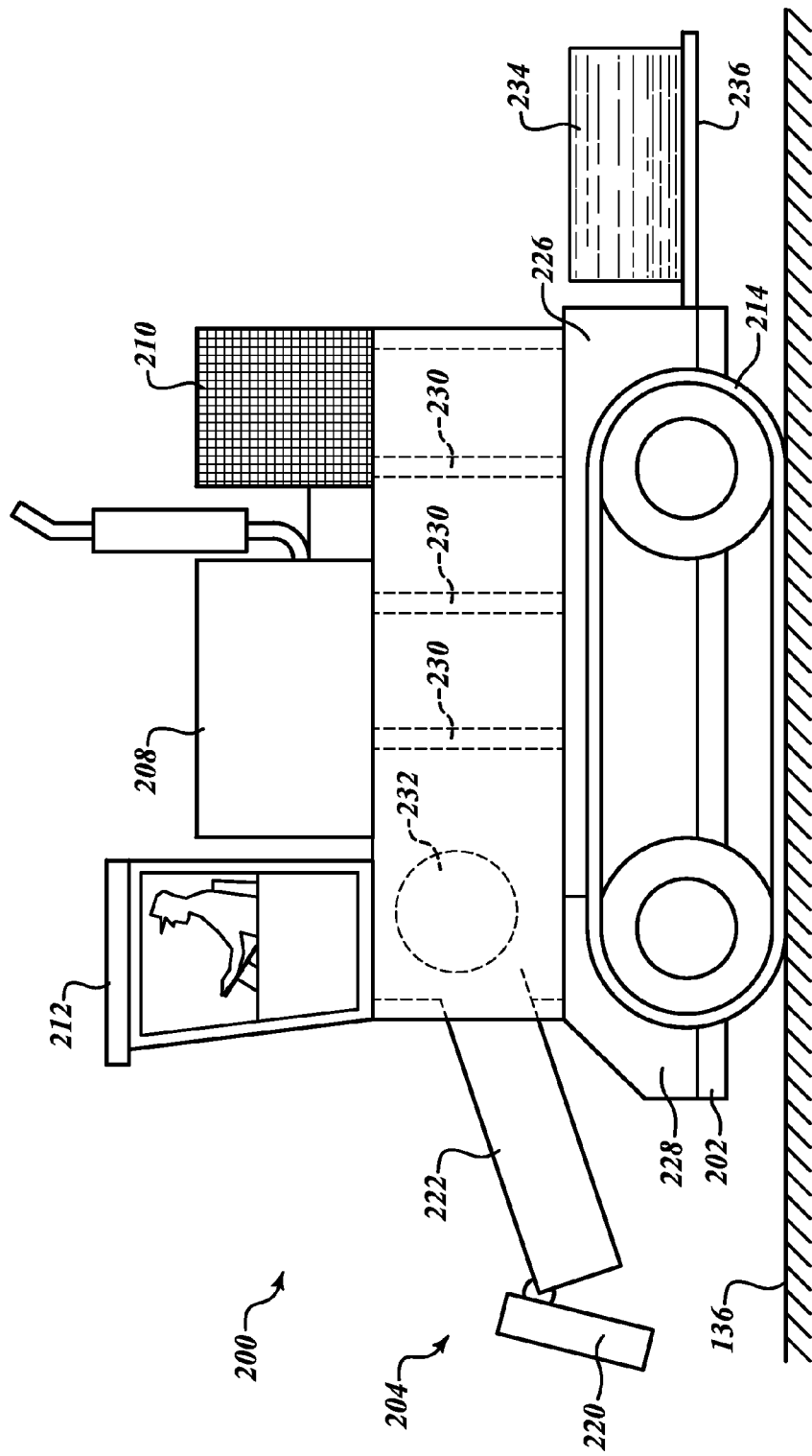
FIG. 4 is a schematic side view of the combination biomass harvester and baler from FIG. 2.

Embodiments of the disclosure include combination biomass harvester/balers that enable harvesting and baling of biomass in a single pass operation. In some embodiments, substantially cylindrical bales may be produced. In other embodiments, substantially rectangular bales may be produced. FIGS. 1 and 3 are schematic side views of an embodiment of the disclosure used to produce substantially round bales. FIGS. 2 and 4 are schematic side views of an embodiment of the disclosure used to produce substantially rectangular bales. Components of combination biomass harvester/balers according to the disclosure will now be discussed in detail with reference to FIGS. 1-4.

Referring to FIG. 1, a schematic side view of a combination biomass harvester/baler 100 according to embodiments of the disclosure is shown. In some embodiments the combination biomass harvester/baler 100 includes a self-propelled vehicle base 102 having a front end 104 and a back end 106. An engine compartment 108 is mounted on the front end 104 of the self-propelled vehicle base 102. A fuel and radiator compartment 110 may also be mounted on the self-propelled vehicle base 102. An operator cab 112 may be situated at the front end 104 of the self-propelled vehicle base 102. Some mechanical structures associated with self-propelled vehicle bases according to the disclosure are well known and are not described in detail. An example of a suitable self-propelled vehicle base for use with embodiments of the disclosure is described in U.S. Pat. No. 4,478,226, which is hereby incorporated by reference.

In some embodiments, the configuration of the engine compartment 108, the radiator compartment 110, and the operator cab 110 may be different from the specific configuration shown in FIG. 1. In some embodiments, these components may be rearranged or located closer to the back end 106 of the self-propelled vehicle base 102. Additionally, one or more of these components may not be present or may be replaced with a different component with similar functionality. Further, the combination biomass harvester/baler 100 may include other similar basic mechanical components known to a person of ordinary skill in the art that are not explicitly shown in FIG. 1.

Referring to FIG. 2, a schematic side view of a combination biomass harvester/baler 200 according to embodiments of the disclosure is shown. In some embodiments the combination biomass harvester/baler 200 includes a self-propelled vehicle base 202 having a front end 204 and a back end 206. An engine compartment 208 is mounted near the front end 204 of the self-propelled vehicle base 202. A fuel and radiator compartment 210 may be mounted on the self-propelled vehicle base 202. An operator cab 212 may be situated at the front end 204 of the self-propelled vehicle base 202.

In some embodiments, the configuration of the engine compartment 208, the radiator compartment 210, and the operator cab 210 may be different than the specific configuration shown in FIG. 2. In some embodiments, these components may be rearranged or located closer to the back end 206 of the self-propelled vehicle base 202. Additionally, one or more of these components may not be present or may be replaced with a different component with similar functionality. Further, the combination biomass harvester and baler 200 may include other similar basic mechanical components known to a person of ordinary skill in the art that are not explicitly shown in FIG. 2.

A movement mechanism (114 in FIG. 1 and 214 in FIG. 2) is operably connected to the self-propelled vehicle base (102 in FIG. 1 and 202 in FIG. 2). In FIG. 1, the movement mechanism 114 includes two or more front wheels 116 and two or more back wheels 118. Both the front wheels 116 and the back wheels 118 may be hydraulically driven. In some embodiments the front wheels 116 and the back wheels 116 may be rubber coated tires having four wheel drive functionality. In FIG. 2, the movement mechanism 214 includes a rubber-coated track. In other embodiments, the movement mechanisms 114 and 214 may include other equipment known to a person of ordinary skill in the art.

Referring back to both FIGS. 1 and 2, embodiments of the disclosure further include a cutting head assembly (120 in FIG. 1 and 220 in FIG. 2) mounted on the front end (104 in FIG. 1 and 204 in FIG. 2) of the self-propelled vehicle base (102 in FIG. 1 and 202 in FIG. 2). Specific details about embodiments of the cutting head assemblies 120 and 220 are discussed later with respect to FIGS. 5-8. Cutting head assemblies 120 and 220 according to the disclosure are configured to cut biomass as the combination biomass harvester/baler (100 in FIG. 1 and 200 in FIG. 2) moves across terrain 136.

Referring again to both FIGS. 1 and 2, a transfer assembly (122 in FIG. 1 and 222 in FIG. 2) is positioned next to the cutting head assembly (120 in FIG. 1 and 220 in FIG. 2). Transfer assemblies 122 and 222 according to the disclosure may be configured to collect and move the biomass that is cut by the cutting head assemblies 120 and 220 to a baler assembly (124 in FIG. 1 and 224 in FIG. 2). Baler assemblies 124 and 224 according to the disclosure may be mounted on the self propelled vehicle bases (102 in FIG. 1 and 202 in FIG. 2) between the cutting head assemblies (122 In FIG. 1 and 222 in FIG. 2) and the back end (106 in FIG. 1 and 206 in FIG. 2).

In some embodiments, transfer assemblies 122 and 22 according to the disclosure may include conveyors with opposing rollers or any other mechanism suitable for moving biomass.

Baler assemblies 124 and 224 according to the disclosure are configured to consolidate the biomass that is cut into one or more bales. FIG. 1 and FIG. 3 depict a baler assembly 124 configured to form substantially cylindrical or round bales. The baler assembly 124 includes a bale chamber 126 having a substantially cylindrical shape and one or more forming devices 128 (e.g., rollers) configured to consolidate the biomass into a densified round bale. The bale chamber 124 may be opened at a hinge point 130. Any type of round baler assembly known to a person of ordinary skill in the art may be used in place of the baler assembly 124 shown in FIG. 1. For example, baler assemblies such as those depicted in U.S. Pat. Nos. 4,750,323 and 4,870,812 (hereby incorporated by reference) may be used with embodiments of the disclosure.

FIG. 3 is a schematic side view of the combination biomass harvester/baler 100 from FIG. 1 which depicts a formed bale 132 being deposited onto a bale carrying platform 134. The bale carrying platform 134 may be positioned at the back end 106 of the self propelled vehicle base 102. The bale carrying platform 134 may be any surface suitable for holding one or more formed round bales 132.

As stated above, baler assemblies 124 and 224 according to the disclosure may be designed to consolidate the biomass cut into round or rectangular bales. Whereas FIG. 1 and FIG. 3 depict a baler assembly 124 configured to form substantially cylindrical or round bales, FIG. 2 and FIG. 4 depict a baler assembly 224 configured to form substantially rectangular bales. The baler assembly 224 includes a bale chamber 226, a bale plunger 228, supports 230, and a bale chamber infeed 232. The bale plunger 228 is arranged in the bale chamber 226 so that it can compress the biomass cut by the cutting head assembly 220 into a substantially rectangular bale. In some embodiments, one or more bale plungers 228 may be used. Any type of rectangular baler assembly known to a person of ordinary skill in the art may be used in place of the baler assembly 224 shown in FIG. 2. For example, baler assemblies such as those depicted in U.S. Pat. Nos. 4,829,756 and 4,819,418 (hereby incorporated by reference) may be used with embodiments of the disclosure.

FIG. 4 is a schematic side view of the combination biomass harvester/baler 200 from FIG. 2 which depicts a formed bale 234 being deposited onto a bale carrying platform 236. The bale carrying platform 236 may be positioned at the back end 206 of the self propelled vehicle base 202. The bale carrying platform 236 may be any surface suitable for holding one or more formed round bales 234.

In FIGS. 5-8, various exemplary embodiments of cutting head assemblies 120 and 220 according to the disclosure are shown schematically. Referring to FIG. 5, one example of cutting head assemblies 120 and 220 according to the disclosure includes a disc cutter 500. The disc cutter 500 includes one or more cutter bars 502 and a plurality of removable blades 504 attached to the cutter bar 502. The cutter bar 502 may be attached to the front end (102 in FIG. 1 and 202 in FIG. 2) of combination biomass harvester and balers according to the disclosure. The plurality of removable blades 504 are oriented in a horizontal manner so that the surface of each of the blades is parallel to the terrain 136. Additionally, a height variation device may be installed to control the height of the one or more cutters bars 502 and the plurality of removable blades with respect to the terrain 136. Accordingly, as the terrain varies, the cutting head assembly (120 in FIG. 1 and 220 in FIG. 2) may self adjust.

Referring to FIG. 6 and FIG. 7, another example of cutting head assemblies 120 and 220 according to the disclosure includes a plurality of stacked sawheads 600. In FIGS. 6 and 7, three stacked sawheads are shown: a first sawhead 602, a second sawhead 604, and a third sawhead 606. A person of ordinary skill in the art will appreciate that other numbers of sawheads may be used with embodiments according to this disclosure. As shown in FIG. 6, the sawheads 600 may be arranged in a horizontal configuration with respect the terrain on which the combination biomass harvest and baler is traveling. Alternatively, as shown in FIG. 7, the sawheads 600 may be arranged in a vertical configuration. As best shown in FIG. 6, the sawheads 600 may be stacked so that the size of the sawheads increases in one direction. For example, the smallest sawhead (the first sawhead 602) may be positioned at the top of the stack, followed by the second smallest sawhead (the second sawhead 604) in the middle of the stack, and the largest sawhead (the third sawhead 606) at the bottom of the stack.

Referring to FIG. 8, another example of cutting head assemblies 120 and 220 according to the disclosure includes one or more string trimmers 800. Each of the string trimmers 800 may include a reel mechanism 802 and a flexible cutting element 804 wrapped around the reel mechanism 802. In some embodiments, the flexible cutting element 804 may include a monofilament wire or a steel cable. As the reel mechanism 802 rotates, the flexible cutting element 804 may cut biomass. In a situation where cutting head assemblies 120 and 220 are being used to cut biomass in rough terrain, a string trimmer 800 may be able to withstand damage from sticks, stumps, roots, or other material typically encountered on forest terrain.

Exemplary methods for operation of embodiments of combination biomass harvester/balers according to the disclosure will now be described with reference to FIGS. 1 and 3. The combination biomass harvester/baler 100 moves across terrain 136 in a manner typical to conventional harvesting equipment such as disc mowers or hay swathers. The cutting head assembly 120 may be hydraulically driven to cut biomass as the self-propelled vehicle base 102 moves. After the biomass is cut, the transfer assembly 122 moves the cut biomass into the baler assembly 124. The forming devices 128 consolidate the biomass into a substantially cylindrical bale 132 as shown in FIG. 3. The bale chamber 126 opens at the hinge point 130 and the cylindrical bale 134 is deposited onto the bale carrying platform 134. The combination biomass harvester/baler 100 may continue to move while the cutting and baling functions are performed.

Exemplary methods for operation of embodiments of combination biomass harvester/balers shown in FIGS. 2 and 4 are similar to those described with respect to FIGS. 1 and 3. The combination biomass harvester/balers 200 moves across terrain 136 in a manner typical to conventional harvesting equipment such as disc mowers or hay swathers. The cutting head assembly 220 may be hydraulically driven to cut biomass as the self-propelled vehicle base 202 moves. After the biomass is cut, the transfer assembly 222 moves the cut biomass into the baler chamber infeed 232. The bale plunger 228 moves to consolidate the biomass into a substantially rectangular bale 234 as shown in FIG. 4. The bale 234 is deposited onto the bale carrying platform 236. The combination biomass harvester and baler 200 may continue to move while the cutting and baling functions are performed.

From the foregoing, it will be appreciated that the specific embodiments of the disclosure have been described herein for purposes of illustration, but that various modifications may be made without deviating from the disclosure. For example, although some of the mechanical components are described as being hydraulically driven, other drive mechanisms known to a person of ordinary skill in the art may be used. Additionally, the baler assemblies may be configured to bale the biomass in shapes not explicitly disclosed that would be obvious to a person of ordinary skill in the art. The cutting head assemblies shown in FIGS. 5-8 may also be modified in a manner that would be apparent to a person of ordinary skill in the art.

Aspects of the disclosure described in the context of particular embodiments may be combined or eliminated in other embodiments. For example, embodiments of components shown explicitly on the embodiments depicted in FIGS. 1 and 3 may be combined with components shown in FIGS. 2 and 4. Further, while advantages associated with certain embodiments of the disclosure may have been described in the context of those embodiments, other embodiments may also exhibit such advantages, and not all embodiments need necessarily exhibit such advantages to fall within the scope of the disclosure. Accordingly, the invention is not limited except as by the appended claims.

We claim:

1. A combination biomass harvester and baler comprising:
   a self-propelled vehicle base, the self-propelled vehicle base having a front end and a back end;
   an engine compartment mounted on the self-propelled vehicle base;
   a fuel and radiator compartment mounted on the self-propelled vehicle base;
   a movement mechanism operably connected to the self-propelled vehicle base and configured to move the combination biomass harvester and baler over terrain;
   a cutting head assembly mounted on the front end of the self-propelled vehicle base, the cutting head assembly comprising one or more rotational cutting mechanisms configured to cut biomass;
   a baler assembly mounted on the self-propelled vehicle base, the baler assembly configured to consolidate the biomass cut by the cutting head assembly into one or more balers;
   a transfer assembly mounted on the self-propelled vehicle base, the transfer assembly configured to collect and move the biomass cut by the cutting head assembly to the baler assembly; and
   a bale carrying platform configured to store the one or more bales after consolidation.

2. The combination biomass harvester and baler of claim 1 wherein the one or more bales are rectangular bales and the baler assembly includes a substantially cubical bale chamber and a bale plunger, the bale plunger arranged in the bale chamber to compress biomass into a rectangular bale.

3. The combination biomass harvester and baler of claim 1 wherein the baler assembly includes a substantially cylindrical bale chamber and one or more forming devices, the one or more forming devices configured to roll the biomass into a round bale.

4. The combination biomass harvester and baler of claim 1, further comprising an operator cab mounted near the front of the self-propelling vehicle base.

5. The combination biomass harvester and baler of claim 1 wherein the movement mechanism is selected from the group consisting of: rubber-coated tracks, rubber-coated treads, and rubber-coated tires.

6. The combination biomass harvester and baler of claim 1 wherein the transfer assembly is a conveyor with one or more opposing rollers.

7. The combination biomass harvester and baler of claim 1 wherein the one or more rotational cutting mechanism comprise:
   one or more string trimmers, wherein each of the one or more string trimmers comprise:
   one or more reel mechanisms; and
   a flexible cutting element wrapped around the one or more reel mechanisms.

8. The combination biomass harvester and baler of claim 7 wherein the flexible cutting element is a monofilament wire or a steel cable.

9. The combination biomass harvester and baler of claim 1 wherein the one or more rotational cutting mechanisms comprise:
   one or more stacked sawheads.

10. The combination biomass harvester and baler of claim 9 wherein the plurality of stacked sawheads are vertically stacked with respect to the terrain.

11. The combination biomass harvester and baler of claim 9 wherein the plurality of stacked sawheads are horizontally stacked with respect to the terrain.

12. The combination biomass harvester and baler of claim 1 wherein the biomass comprises woody and herbaceous material from forest growth.

13. The combination biomass harvester and baler of claim 7 wherein the one or more string trimmers are configured to withstand damage from material located on the terrain.

14. The combination biomass harvester and baler of claim 9 wherein each of the one or more stacked sawheads comprise:
   a first sawhead;
   a second sawhead; and
   a third sawhead.

15. The combination biomass harvester and baler of claim 14 wherein the first sawhead is smaller than the second sawhead and the second sawhead is smaller than the third sawhead.

16. The combination biomass harvester and baler of claim 15 wherein the first sawhead is located at a top of the stacked sawheads, the second sawhead is located at a middle of the stacked sawheads, and the third sawhead is located at a bottom of the stacked sawheads.

17. The combination biomass harvester and baler of claim 1 wherein:
   the cutting head assembly comprises one or more cutter bars; and
   the one or more rotational cutting mechanisms comprise one or more removable blades attached to each of the one or more cutter bars.

18. The combination biomass harvester and baler of claim 17 wherein the one or more removable blades are oriented substantially parallel to the terrain.

19. The combination biomass harvester and baler of claim 17 wherein the cutting head assembly further comprises a height variation device configured to adjust the height of the one or more cutter bars.

20. The combination biomass harvester and baler of claim 19 wherein the height variation device is further configured to adjust the height of the one or more cutter bars according to variations in the terrain.

\* \* \* \* \*